US010040487B2

(12) United States Patent
Kabayama

(10) Patent No.: US 10,040,487 B2
(45) Date of Patent: Aug. 7, 2018

(54) VEHICLE BODY STRUCTURE FOR AUTOMOBILE

(71) Applicant: HONDA MOTOR CO., LTD., Tokyo (JP)

(72) Inventor: Shohei Kabayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 15/390,860

(22) Filed: Dec. 27, 2016

(65) Prior Publication Data

US 2017/0197667 A1    Jul. 13, 2017

(30) Foreign Application Priority Data

Jan. 12, 2016 (JP) ................... 2016-003371

(51) Int. Cl.
*B62D 21/08* (2006.01)
*B62D 21/15* (2006.01)
(Continued)

(52) U.S. Cl.
CPC .......... *B62D 25/2027* (2013.01); *B60G 11/26* (2013.01); *B60G 11/27* (2013.01);
(Continued)

(58) Field of Classification Search
CPC ........ B62D 21/00; B62D 21/06; B62D 21/08; B62D 21/10; B62D 21/155; B62D 21/152;
(Continued)

(56) References Cited

U.S. PATENT DOCUMENTS 3,918,850 A * 11/1975 Bridigum ................ B61C 17/00
                                                                  417/363
6,206,460 B1 * 3/2001 Seeliger ................. B62D 21/00
                                                                  188/267
(Continued)

FOREIGN PATENT DOCUMENTS

JP          2000-1113         1/2000
JP       2005-521587 A        7/2005
(Continued)

OTHER PUBLICATIONS

Office Action dated Sep. 6, 2017, issued in counterpart Japanese Application No. 2016-003371, with English translation (6 pages).
(Continued)

*Primary Examiner* — Joseph M Rocca
*Assistant Examiner* — Daniel S Yeagley
(74) *Attorney, Agent, or Firm* — Westerman, Hattori, Daniels & Adrian, LLP

(57) ABSTRACT

A vehicle body structure for an automobile includes left and right rear side frames that extend in a front-rear direction, a rear floor that connects the left and right rear side frames to each other and that includes a lower surface having a rear portion where a compressor for air suspension is supported, a compressor housing that covers the compressor, and left and right rear braces that are disposed so as to form a V shape having an opening on a front side in top view and that couple front portions of the left and right rear side frames to the compressor housing.

16 Claims, 5 Drawing Sheets

(51) Int. Cl.
  *B62D 25/20* (2006.01)
  *B60G 11/26* (2006.01)
  *B60K 15/063* (2006.01)
  *B62D 25/16* (2006.01)
  *B60G 11/27* (2006.01)

(52) U.S. Cl.
  CPC ............ *B60K 15/063* (2013.01); *B62D 21/08* (2013.01); *B62D 21/155* (2013.01); *B62D 25/16* (2013.01); *B60G 2202/152* (2013.01); *B60G 2202/416* (2013.01); *B60G 2204/15* (2013.01); *B60G 2204/20* (2013.01); *B60K 2015/0634* (2013.01); *B62D 25/20* (2013.01)

(58) Field of Classification Search
  CPC .... B62D 21/11; B62D 21/09; B62D 25/2027; B62D 25/2018; B62D 25/20; B62D 25/087; B62D 25/082; B62D 65/02; B62D 65/024; B60G 2204/20; B62K 25/00
  See application file for complete search history.

(56) References Cited

U.S. PATENT DOCUMENTS

| | | | | |
|---|---|---|---|---|
| 7,905,541 | B2* | 3/2011 | Yamaguchi | B62D 25/2027 296/203.04 |
| 9,783,234 | B2* | 10/2017 | Tanaka | B62D 21/11 |
| 2003/0173799 | A1* | 9/2003 | Wendland | B62D 21/152 296/187.01 |
| 2003/0230443 | A1* | 12/2003 | Cramer | B60G 3/20 180/65.51 |
| 2005/0110303 | A1* | 5/2005 | Neumeier | B62D 21/00 296/204 |
| 2006/0175872 | A1* | 8/2006 | Wada | B62D 25/082 296/193.07 |
| 2007/0051549 | A1* | 3/2007 | Fukuda | B60K 1/00 180/232 |
| 2007/0205635 | A1* | 9/2007 | Bunsmann | B62D 21/00 296/204 |
| 2009/0001767 | A1* | 1/2009 | Yamaguchi | B60K 15/063 296/203.04 |
| 2016/0090124 | A1* | 3/2016 | Kaneko | B62D 25/2027 296/203.04 |
| 2016/0144897 | A1* | 5/2016 | Cho | B62D 21/08 296/204 |
| 2017/0073019 | A1* | 3/2017 | Kabayama | B62D 21/155 |

FOREIGN PATENT DOCUMENTS

| | | |
|---|---|---|
| JP | 2006-264482 A | 10/2006 |
| JP | 3961114 B2 | 8/2007 |
| JP | 2012-131281 A | 7/2012 |

OTHER PUBLICATIONS

Co-pending U.S. Appl. No. 15/262,497 which claims foreign priority to JP 2015-180952 (cited in specification).

* cited by examiner

VEHICLE BODY STRUCTURE FOR AUTOMOBILE

CROSS REFERENCES TO RELATED APPLICATIONS

The present application claims priority under 35 U.S.C. § 119 to Japanese Patent Application No. 2016-003371, filed Jan. 12, 2016, entitled "Vehicle Body Structure for Automobile." The contents of this application are incorporated herein by reference in their entirety.

STATEMENT REGARDING PRIOR DISCLOSURES BY THE INVENTOR OR A JOINT INVENTOR UNDER 37 C.F.R. 1.77(b)(6)

Japanese Patent Application No. 2015-180952 was filed on Sep. 14, 2015. The inventor of the Japanese Patent Application No. 2015-180952 is Shohei Kabayama who is the inventor of the present application. U.S. patent application Ser. No. 15/262,497 was filed on Sep. 12, 2016 which claims a foreign priority to Japanese Patent Application No. 2015-180952. The inventor of the U.S. patent application Ser. No. 15/262,497 is Shohei Kabayama who is the inventor of the present application. The applicant, HONDA MOTOR CO., LTD., of the U.S. patent application Ser. No. 15/262,497 is an assignee who obtained the invention of the U.S. Patent Application from the present inventor.

TECHNICAL FIELD

The present disclosure relates to a vehicle body structure for an automobile that supports a compressor for air suspension at a lower surface of a rear floor.

BACKGROUND

A structure in which a subtark where compressed air for air suspension is accumulated is disposed on the inner side of a front fender is known from Japanese Unexamined Patent Application Publication No. 2000-1113. Also, a structure in which air springs for air suspension are disposed between a front side frame and a support beam that supports a front wheel is known from Japanese Patent No. 3961114.

SUMMARY

The following structure that increases the rigidity of a rear portion of a vehicle body has been proposed in Japanese Patent Application No. 2015-180952 (unpublished at the time of filing of the prior Japanese application of the present application) filed by the applicant of the present application: left and right front braces (floor braces) that extend rearward and outward in the vehicle width direction from rear ends of left and right floor frames provided on a front floor are connected to left and right coupling members provided on left and right rear side frames. In addition, left and right rear braces that extend rearward and inward in the vehicle width direction from the left and right coupling members are connected to support brackets provided in a central portion in the vehicle width direction of the rear floor.

In an automobile equipped with the above-described rear braces, when an air compressor that generates compressed air for operation of air suspension is disposed on a lower surface of the rear floor, the compressor may interfere with the rear braces. In this case, it is difficult to achieve a layout in a compact manner. The present application describes, for example, a structure in which the torsion rigidity of a rear portion of a vehicle body is ensured while avoiding interference of a compressor disposed on a lower surface of a rear floor with rear braces disposed on the lower surface of the rear floor.

According to one aspect of the present application, a vehicle body structure for an automobile includes left and right rear side frames that extend in a front-rear direction, a rear floor that connects the left and right rear side frames to each other and that includes a lower surface having a rear portion where a compressor for air suspension is supported, a compressor housing that covers the compressor, and left and right rear braces that are disposed so as to form a V shape having an opening on a front side in top view and that couple front portions of the left and right rear side frames to the compressor housing.

Thus, the torsion rigidity of the rear portion of the vehicle body is increased by the rear braces while avoiding interference of the rear braces with the compressor and protecting the compressor by covering the compressor with the compressor housing. In addition, a collision load due to a rear end collision can be dispersed by being transmitted from the compressor housing to the rear side frames through the rear braces.

The vehicle body structure for an automobile may further include two front securing portions provided on the left and right rear side frames, two rear securing portions provided on the left and right rear side frames, a quadrangle frame-shaped subframe having four corners supported by the two front securing portions and the two rear securing portions, left and right coupling members, and left and right subframe support brackets provided on the lower surface of the rear floor. In this case, the two rear securing portions are coupled to the left and right subframe support brackets with the left and right coupling members interposed therebetween, and ends of the compressor housing in a vehicle width direction are secured to the left and right subframe support brackets.

Thus, in addition to an increase in torsion rigidity of the rear portion of the vehicle body due to coupling of the left and right rear side frames with the subframe, the left and right rear coupling members and the compressor housing function as a cross member that couples the left and right rear side frames to each other. This can further increase the torsion rigidity of the rear portion of the vehicle body.

The vehicle body structure for an automobile may further include a recessed storage portion formed by recessing a portion of the rear floor. In this case, the compressor housing includes a front wall extending downward from the lower surface of the rear floor and a bottom wall extending rearward from a lower end of the front wall, the compressor housing has an L shape in section formed by the front wall and the bottom wall, and a rear end of the bottom wall is connected to the recessed storage portion.

Thus, the size and the weight of the compressor housing can be reduced by utilizing the recessed storage portion so as to cover a rear portion of the compressor.

In the vehicle body structure for an automobile, the recessed storage portion may include a reinforcing member that reinforces a lower surface of the recessed storage portion. In this case, the rear end of the bottom wall of the compressor housing is connected the reinforcing member.

Thus, the support strength of the compressor housing can be increased by the reinforcing member.

The vehicle body structure for an automobile may further include a cross member that is provided in a vehicle width direction on the lower surface of the rear floor and that includes a compressor securing wall. The vehicle body structure for an automobile may also include a securing portion. In this case, the compressor is secured to the compressor securing wall with the securing portion, the front wall of the compressor housing is secured to the compressor securing wall at a position further to an outer side than the securing portion in the vehicle width direction, and a front wall of the recessed storage portion is connected to a rear end of the compressor securing wall.

Thus, the compressor and the compressor housing can be firmly supported by utilizing the cross member.

In the vehicle body structure for an automobile, a gap that allows a pipe for compressed air extending from the compressor to be inserted therethrough may be formed between the compressor housing and the recessed storage portion.

Thus, routing of the pipe for compressed air is facilitated.

The vehicle body structure for an automobile may further include a front floor, a kick-up portion through which a front end of the rear floor is continuous with a rear end of the front floor, left and right floor frames that extend in the front-rear direction and that are provided on the front floor, and left and right front braces. In this case, front ends of the left and right rear braces are coupled to rear ends of the left and right floor frames with the left and right front braces interposed therebetween.

Thus, the rigidity of the kick-up portion that is easily bent in the up-down direction can be increased by the rear braces and the front braces. In addition, a collision load from the rear side can be dispersed by being transmitted via the rear braces and the front braces to the rear side frames and the floor frames.

The vehicle body structure for an automobile may further include left and right connecting portions that connect the left and right front braces to the left and right rear braces. In this case, a fuel tank is disposed between the left and right connecting portions, and a canister for the fuel tank is disposed between the left and right rear braces.

Thus, a space below the rear floor can be effectively used so as to dispose the fuel tank and the canister.

The vehicle body structure for an automobile may further include a rear wheel house provided further to an outer side than one of the rear side frames. In this case, an air tank in which pressure is accumulated by the compressor is disposed in the rear wheel house.

Thus, a space in the rear wheel house can be used to allow the air tank to be laid out in a compact manner.

For example, a rear cross member 14 of an embodiment corresponds to the cross member of the application, rear coupling members 25 of the embodiment correspond to the coupling members of the application, a lower reinforcing plate 28 of the embodiment corresponds to the reinforcing member of the application, and stays 30 of the embodiment correspond to the securing portion of the application.

BRIEF DESCRIPTION OF THE DRAWINGS

The advantages of the disclosure will become apparent in the following description taken in conjunction with the following drawings.

DETAILED DESCRIPTION

An embodiment of the present application will be described below with reference to FIGS. 1 to 5. Herein, the front-rear direction, the left-right direction (width direction), and the up-down direction are defined with reference to an occupant seated in the driver's seat.

Figure 1:
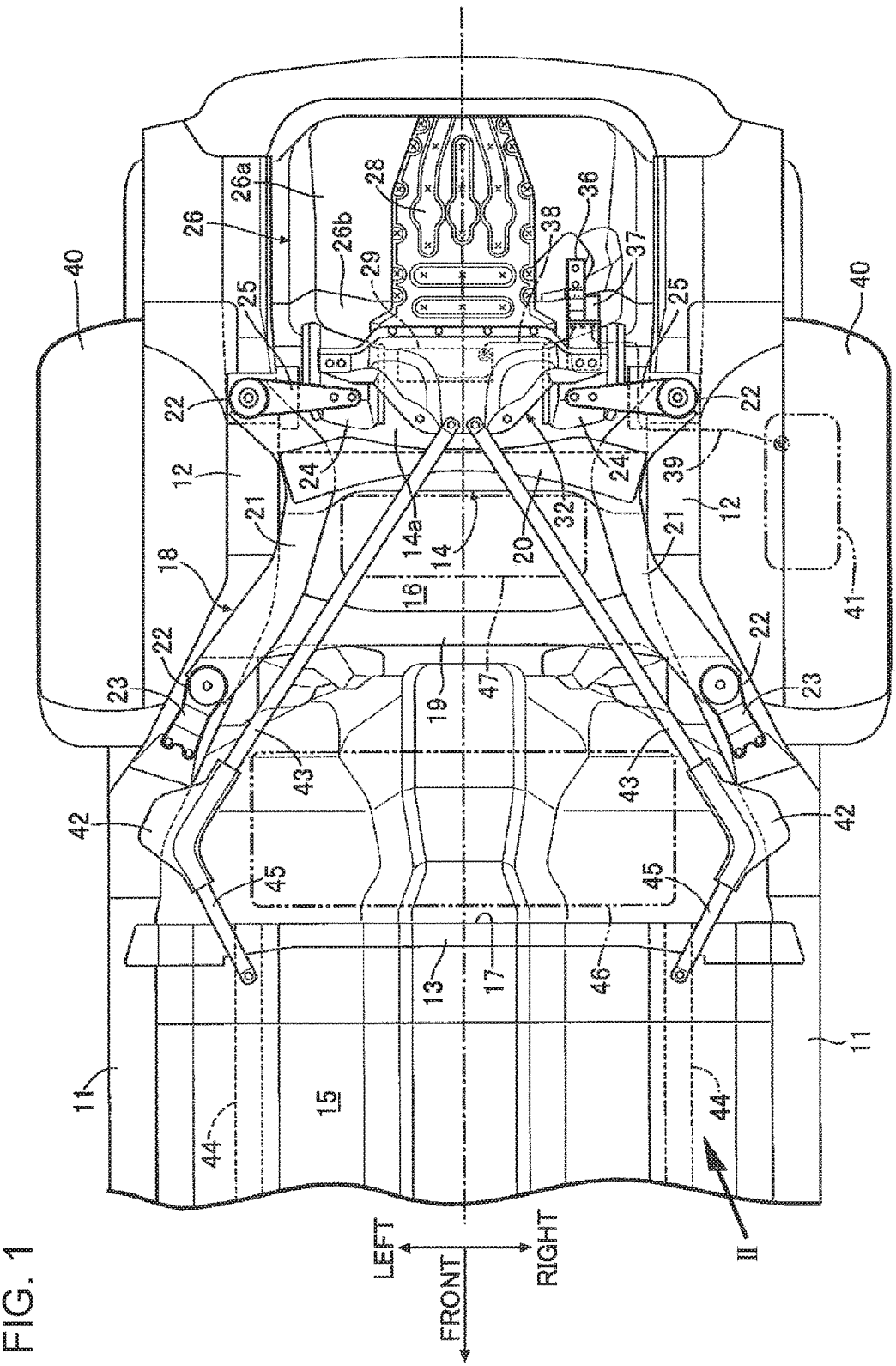
FIG. 1 is a bottom view of a rear portion of a vehicle body of an automobile.

As illustrated in FIG. 1, rear ends of a pair of left and right side sills 11 that extend in the front-rear direction along the left and right sides of the vehicle body are connected to front ends of a pair of left and right rear side frames 12 that extend in the front-rear direction. The rear ends of the left and right side sills 11 are connected to each other through a middle cross member 13 that extends in the vehicle width direction, and middle portions of the left and right rear side frames 12 in the front-rear direction are connected to each other by a rear cross member 14 that extends in the vehicle width direction. A front floor 15 spans between the left and right side sills 11 in front of the middle cross member 13, and a rear floor 16 spans between the left and right rear side frames 12 and is located to the rear of the middle cross member 13. The rear floor 16 is formed so as to be higher than the front floor 15 by a single step with a kick-up portion 17 interposed therebetween. The kick-up portion 17 extends along the middle cross member 13 in the vehicle width direction.

Figure 2:
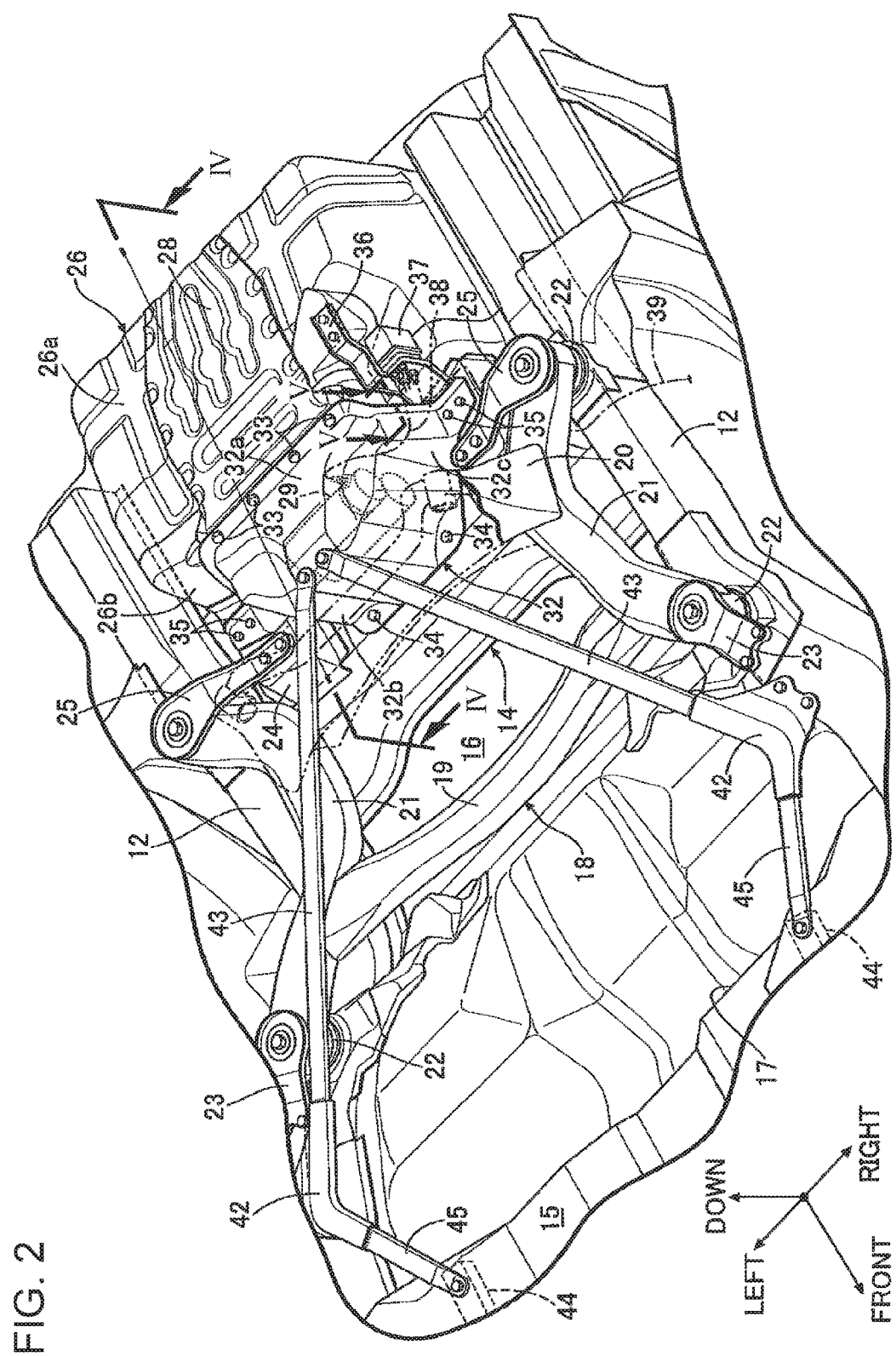
FIG. 2 illustrates a structure of FIG. 1 seen in an arrow II direction of FIG. 1.
Figure 3:
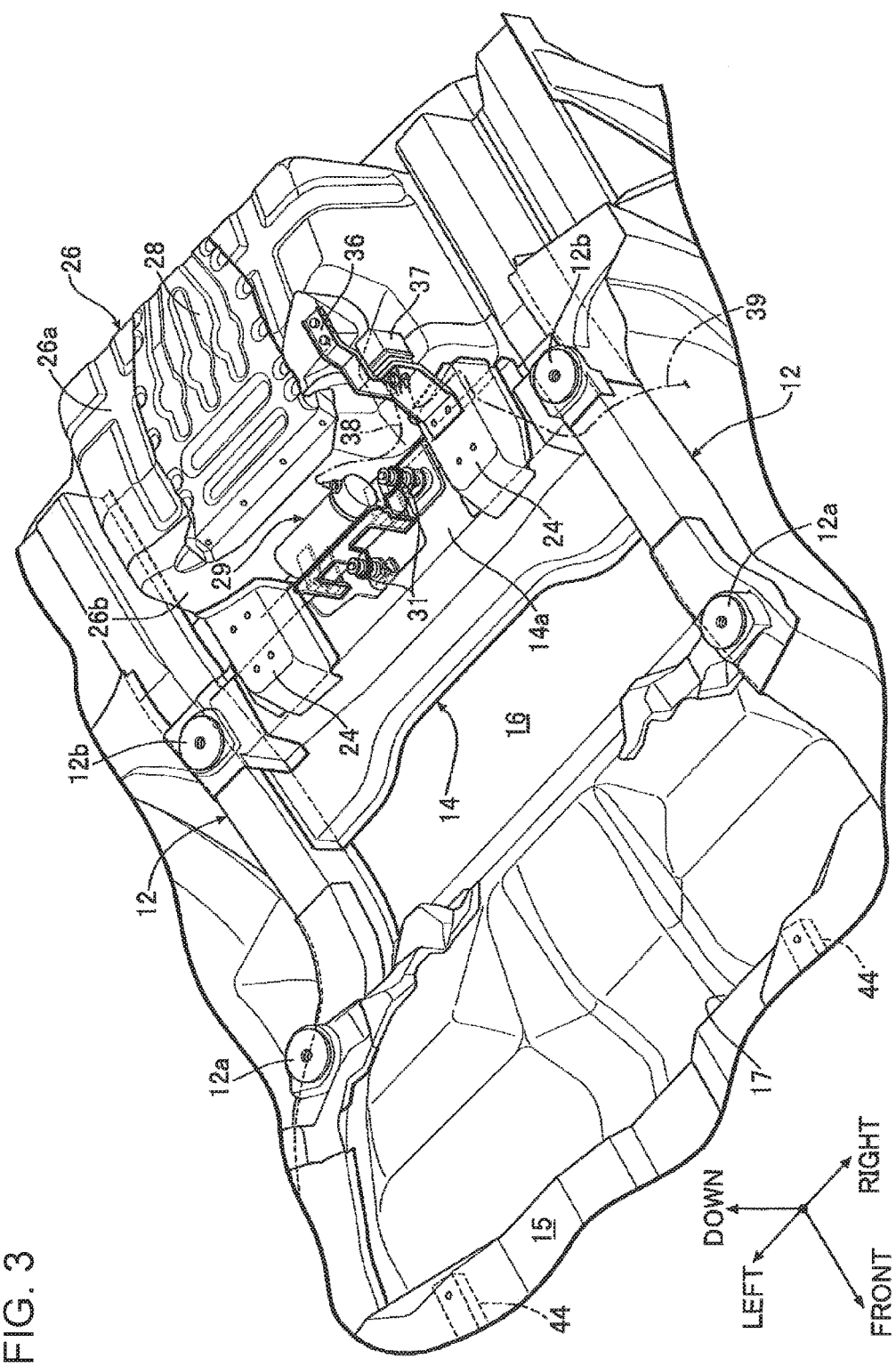
FIG. 3 illustrates the structure of FIG. 2 with components such as a subframe, a compressor housing, rear braces, and front braces removed.
Figure 4:
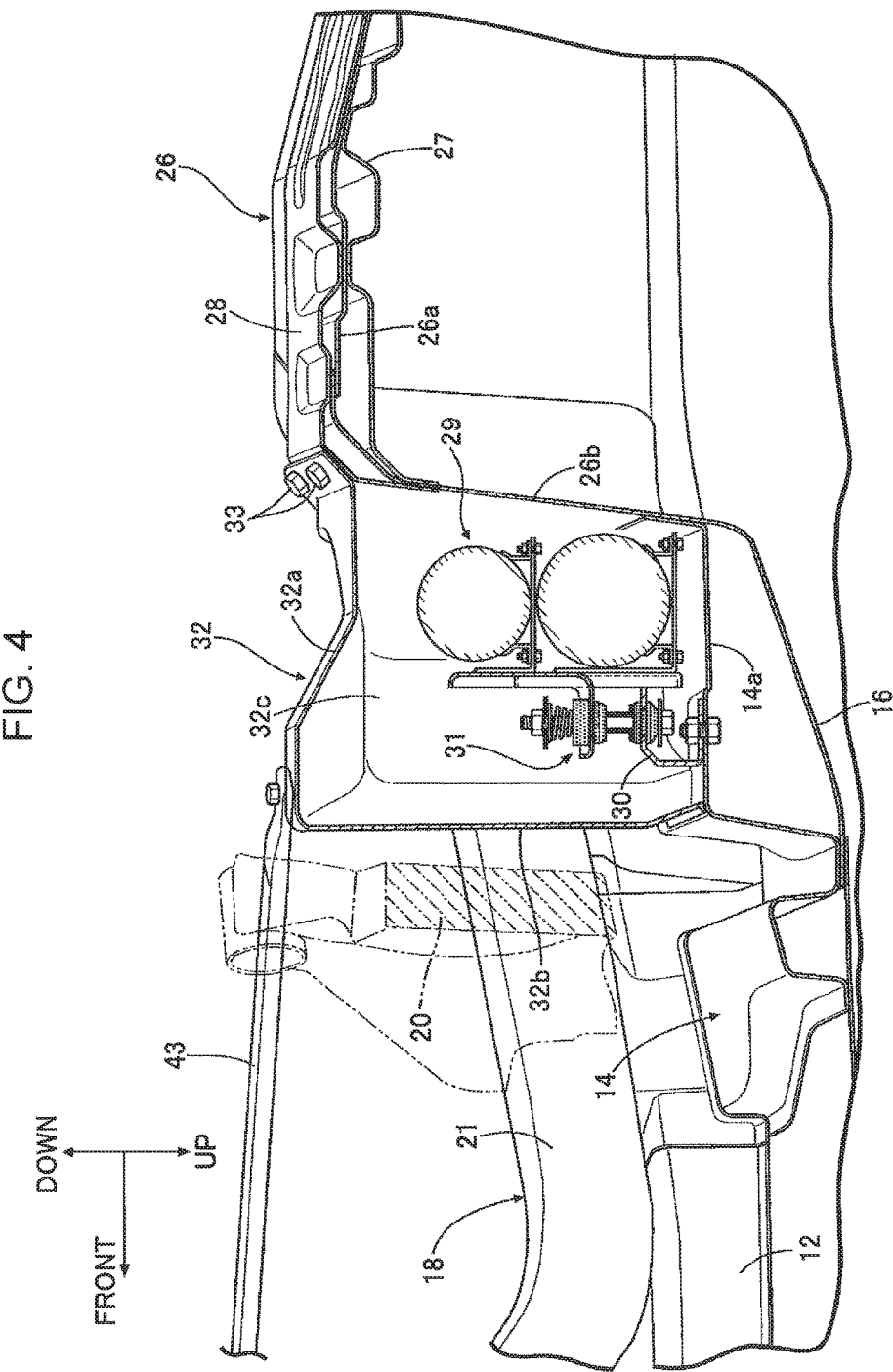
FIG. 4 is a sectional view of the structure of FIG. 2 taken along line IV-IV of FIG. 2.
Figure 5:
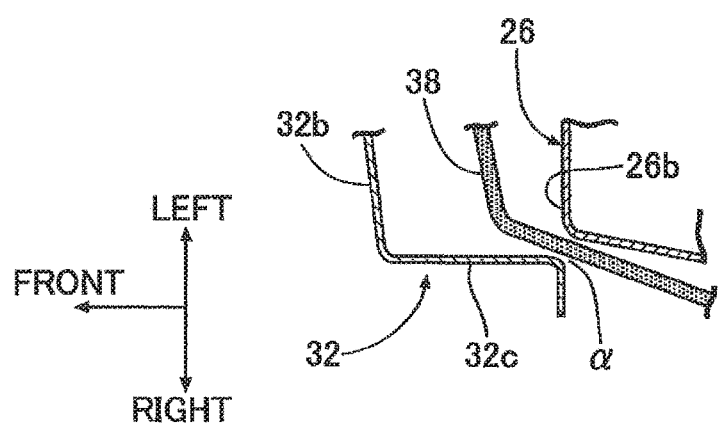
FIG. 5 is a sectional view of the structure of FIG. 2 taken along line V-V of FIG. 2.

As illustrated in FIGS. 2 to 4, a subframe 18 that supports an air suspension system (not illustrated) and the like includes a front lateral frame 19, a rear lateral frame 20, and a pair of left and right longitudinal frames 21. The front lateral frame 19, the rear lateral frame 20, and the pair of left and right longitudinal frames 21 are connected to one another so as to form a number-sign shape. The four corners of the subframe 18 are supported by being suspended from front securing portions 12a, 12a and rear securing portions 12b, 12b (see FIG. 3) disposed on lower surfaces of the left and right rear side frames 12 with rubber bush mounts 22 interposed therebetween. Furthermore, front ends of the left and right longitudinal frames 21 are coupled to lower surfaces of the left and right rear side frames 12 with front coupling members 23 that extend in the front-rear direction interposed therebetween. A pair of left and right subframe support brackets 24 are provided on a lower surface of a compressor securing wall 14a, which is formed by extending the rear cross member 14 rearward. Rear ends of the left and right longitudinal frames 21 of the subframe 18 are coupled to the left and right subframe support brackets 24 with a rear coupling members 25 that extend in the vehicle width direction interposed therebetween.

A recessed storage portion 26 is formed so as to be recessed downward in a portion of the rear floor 16 located at the rear of the subframe 18. A spare tire and a battery are stored in the recessed storage portion 26. An upper reinforcing plate 27 (see FIG. 4) and a lower reinforcing plate 28 are respectively superposed on upper and lower surfaces of a bottom wall 26a of the recessed storage portion 26 for reinforcement.

A compressor 29 that generates high-pressure air for the air suspension system is disposed below the rear floor 16 in front of a front wall 26b of the recessed storage portion 26. That is, the compressor securing wall 14a of the rear cross member 14 superposed on a lower surface of the rear floor 16 is connected to the front wall 26b of the recessed storage portion 26, and the compressor 29 is supported by a plurality of stays 30 secured to a lower surface of the compressor securing wall 14a with elastic support devices 31 for isolation from vibration interposed between the stays 30 and compressor 29.

A compressor housing 32 that covers the compressor 29 includes a bottom wall 32a a front wall 32b, and left and right side walls 32c. The bottom wall 32a and the front wall 32b form an L shape in section. The left and right side walls 32c are connected to ends of the bottom wall 32a in the vehicle width direction and ends of the front wall 32b in the vehicle width direction. A rear end of the bottom wall 32a is secured by bolts 33 to a front end of the lower reinforcing plate 28 that reinforces the recessed storage portion 26. An upper end of the front wall 32b is secured to the compressor securing wall 14a by bolts 34. Upper ends of the left and right side walls 32c are each secured by bolts 35 to a corresponding one of the left and right subframe support brackets 24. In this state, a rear side and an upper side of the compressor housing 32 that are open are respectively covered with the front wall 26b of the recessed storage portion 26 and the compressor securing wall 14a. Thus, the compressor 29 is substantially entirely surrounded, and accordingly, leakage of noise can be prevented.

A right end of the bottom wall 26a of the recessed storage portion 26 is connected t the right subframe support bracket 24 through a stay 36. A solenoid valve 37 supported by the stay 36 is connected to the compressor 29 through a pipe 38 and to an air tank 41 (see FIG. 1) disposed in a right rear wheel house 40 through another pipe 39. In this state, the pipe 38 that connects the compressor 29 and the solenoid valve 37 to each other is guided to the outside (see FIG. 5) through a gap α formed between a rear end of the right side wall 32c of the compressor housing 32 and a right end of the front wall 26b of the recessed storage portion 26.

A pair of left and right coupling brackets 42 are provided on front lower surfaces of the left and right rear side frames 12. The pair of the left and right coupling brackets 42 are coupled to a front end of the bottom wall 32a of the compressor housing 32 by a pair of left and right rod-shaped rear braces 43. A pair of left and right floor frames 44 that extend in the front-rear direction are provided on an upper surface of the front floor 15 that extends forward from the kick-up portion 17. Rear ends of the left and right floor frames 44 are coupled to the left and right coupling brackets 42 by a pair of left and right rod-shaped front braces 45. The left and right rear braces 43 that straddle the subframe 18 under the subframe 18 are arranged at angles toward the inner side in the vehicle width direction from the front side to the rear side so as to form a V shape. The left and right front braces 45 that straddle the kick-up portion 17 are arranged at angles toward the outer sides in the vehicle width direction from the front side to the rear side so as to form an inverted V shape.

A fuel tank 46 and a canister 47 are disposed under the rear floor 16 as follows: the fuel tank 46 is disposed at a position between the left and right coupling brackets 42 that connect the front braces 45 to the rear braces 43; and the canister 47 that absorbs fuel vapor generated in the fuel tank 46 is disposed at a position which is surrounded by the front lateral frame 19, the rear lateral frame 20, and the left and right longitudinal frames 21 of the number-sign shaped subframe 18 and which is interposed between the left and right rear braces 43.

Next, operation according to the embodiment of the present application having the above-described structure will be described.

The front wall 26b of the recessed storage portion 26, the compressor securing wall 14a of the rear cross member 14, and the compressor housing 32, which includes the bottom wall 32a, the front wall 32b, the left and right side walls 32c, cooperate with one another to cover the entirety of the compressor 29, which is used for air suspension, supported by a rear lower surface of the rear floor 16 connecting the left and right rear side frames 12 to each other. Thus, in addition to allow the compressor 29 to be reliably protected from flying pebbles and the like thrown by front wheels, the size and the weight of the compressor housing 32 can be reduced compared to the case where the entirety of the compressor 29 is covered only with the compressor housing 32.

Furthermore, the rear end of the bottom wall 32a of the compressor housing 32 is connected to the lower reinforcing plate 28 that reinforces the lower surface of the recessed storage portion 26. Thus, the support strength of the compressor housing 32 can be increased by the lower reinforcing plate 28. Furthermore, the gap a that allows the pipe 38 for compressed air extending from the compressor 29 to be inserted therethrough is formed between the compressor housing 32 and the recessed storage portion 26. This facilitates routing of the pipe 38 for compressed air.

Furthermore, the left and right coupling brackets 42 provided on the front side of the left and right rear side frames 12 are coupled to the compressor housing 32 by the left and right rear braces 43. The left and right rear braces 43 are arranged to form a V shape having an opening on the front side in top view. Thus, torsion rigidity of a rear portion of the vehicle body is increased by the rear braces 43 while avoiding interference of the rear braces 43 with the compressor 29. In addition, a collision load due to a rear end collision can be dispersed by being transmitted from the compressor housing 32 to the rear side frames 12 through the rear braces 43.

Furthermore, four corners of the quadrangle frame-shaped subframe 18 are supported by two front securing portions 12a and two rear securing portions 12b provided in the left and right rear side frames 12. Thus, the left and right rear side frames 12 are coupled to each other with the subframe 18 interposed therebetween. This can increase the torsion rigidity of the rear portion of the vehicle body.

Furthermore, two rear securing portions 12b of the rear side frames 12 are coupled to the left and right subframe support brackets 24 provided on the lower surface of the rear floor 16 via the left and right rear coupling members 25 interposed between two rear securing portions 12b and the left and right subframe support brackets 24, and the left and right side walls 32c of the compressor housing 32 are secured to the left and right subframe support brackets 24. Thus, the left and right rear coupling members 25 and the compressor housing 32 function as a cross member that couples the left and right rear side frames 12 to each other. This can further increase the torsion rigidity of the rear portion of the vehicle body.

Furthermore, the compressor 29 is secured to the compressor securing wall 14a of the rear cross member 14 provided in the vehicle width direction on the lower surface of the rear floor 16, the front wall 32b of the compressor housing 32 is secured to the compressor securing wall 14a at both ends in the vehicle width direction, and the front wall 26b of the recessed storage portion 26 is connected to rear end of the compressor securing wall 14a. Thus, the compressor 29 and the compressor housing 32 can be firmly supported by utilizing the rear cross member 14.

Since a front end of the rear floor 16 is continuous with a rear end of the front floor 15 through the kick-up portion 17, the flexural rigidity of the kick-up portion 17 being a bent portion of the vehicle body is not so high. However, the rear ends of the left and right floor frames 44 being strength members provided on the front floor 15 are coupled with front portions of the left and right rear side frames 12 being strength members by the left and right front braces 45 that straddle the kick-up portion 17, thereby the flexural rigidity of the kick-up portion 17 is effectively increased.

Furthermore, rear ends of the left and right front braces 45 are connected to the front ends of the left and right rear braces 43 by the left and right coupling brackets 42 provided in the rear side frames 12. Thus, a collision load from the rear side can be dispersed by being transmitted from the left and right rear braces 43 to the rear side frames 12 and the floor frames 44.

Furthermore, the fuel tank 46 is disposed between the left and right coupling brackets 42 that connect the left and right front braces 45 to the left and right rear braces 43, and the canister 47 is disposed between the left and right rear braces 43 that extend rearward from the left and right coupling brackets 42. Thus, a space below the rear floor 16 can be effectively used so as to dispose the fuel tank 46 and the canister 47.

Furthermore, the air tank 41, in which the pressure is accumulated by the compressor 29, is disposed in the rear wheel house 40. Thus, a space in the rear wheel house 40 can be used to allow the air tank 41 to be laid out in a compact manner.

Although the embodiment according to the present application has been described, various design changes may be made on the present application without departing from the gist of the present application. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body structure for an automobile comprising:
   left and right rear side frames that extend in a front-rear direction, respectively;
   a rear floor that connects the left and right rear side frames to each other;
   a compressor for air suspension attached to a lower surface of a rear portion of the rear floor;
   a compressor housing that covers the compressor; and
   left and right rear braces that are disposed so as to have a V shape having an opening on a front side thereof in top view and that couple front portions of the left and right rear side frames to the compressor housing, respectively.

2. The vehicle body structure for an automobile according to claim 1, further comprising:
   left and right front securing portions provided on the left and right rear side frames, respectively;
   left and right rear securing portions provided on the left and right rear side frames, respectively;
   a quadrangle frame-shaped subframe having four corners supported by the left and right front securing portions and the left and right rear securing portions, respectively;
   left and right coupling members; and
   left and right subframe support brackets provided on the lower surface of the rear floor,
   wherein the left and right rear securing portions are coupled to the left and right subframe support brackets via the left and right coupling members interposed therebetween, respectively, and
   wherein left and right ends of the compressor housing in a vehicle width direction are secured to the left and right subframe support brackets, respectively.

3. The vehicle body structure for an automobile according to claim 2, wherein the left and right coupling members extend in a vehicle width direction, and the compressor housing extends in the vehicle width direction.

4. The vehicle body structure for an automobile according to claim 1, further comprising:
   a recessed storage portion formed by recessing a portion of the rear floor downward,
   wherein the compressor housing includes a front wall extending downward from the lower surface of the rear floor and a bottom wall extending rearward from a lower end of the front wall, the compressor housing has an L shape in section formed by the front wall and the bottom wall, and a rear end of the bottom wall is connected to the recessed storage portion.

5. The vehicle body structure for an automobile according to claim 4,
   wherein the recessed storage portion includes a reinforcing member that reinforces a lower surface of the recessed storage portion, and
   wherein the rear end of the bottom wall of the compressor housing is connected to the reinforcing member.

6. The vehicle body structure for an automobile according to claim 4, further comprising:
   a cross member provided on the lower surface of the rear floor and extending in a vehicle width direction, the cross member including a compressor securing wall; and
   a securing portion,
   wherein the compressor is secured to the compressor securing wall with the securing portion, and
   wherein the front wall of the compressor housing is secured to the compressor securing wall at a position on an outer side in the vehicle width direction of the securing portion, and a front wall of the recessed storage portion is connected to a rear end of the compressor securing wall.

7. The vehicle body structure for an automobile according to claim 6, wherein the compressor is secured to a bottom surface of the compressor securing wall.

8. The vehicle body structure for an automobile according to claim 4,
   wherein a gap causing a pipe for compressed air extending from the compressor to be inserted therethrough is formed between the compressor housing and the recessed storage portion.

9. The vehicle body structure for an automobile according to claim 4, wherein the compressor is disposed in front of the recessed storage portion.

10. The vehicle body structure for an automobile according to claim 1, further comprising:
    a front floor;
    a kick-up portion through which a front end of the rear floor is connected to a rear end of the front floor;
    left and right floor frames that extend in the front-rear direction and that are provided on the front floor; and
    left and right front braces,
    wherein front ends of the left and right rear braces are coupled to rear ends of the left and right floor frames respectively via the left and right front braces interposed therebetween respectively.

11. The vehicle body structure for an automobile according to claim 10, further comprising:
left and right connecting portions that connect the left and right front braces to the left and right rear braces, respectively,
wherein a fuel tank is disposed between the left and right connecting portions, and a canister for the fuel tank is disposed between the left and right rear braces.

12. The vehicle body structure for an automobile according to claim 1, further comprising:
a rear wheel house provided on an outer side in the vehicle width direction of one of the rear side frames,
wherein an air tank in which pressure is accumulated by the compressor is disposed in the rear wheel house.

13. The vehicle body structure for an automobile according to claim 1, wherein the compressor housing is disposed at a substantial middle position of the rear floor in a vehicle width direction.

14. The vehicle body structure for an automobile according to claim 13, wherein the compressor housing is disposed below the compressor to cover a bottom of the compressor, and the left and right rear braces are connected to a bottom wall of the compressor housing.

15. The vehicle body structure for an automobile according to claim 14, wherein the left and right rear braces are connected to a front end of the bottom wall of the compressor housing.

16. A vehicle comprising the vehicle body structure for an automobile according to claim 1.

* * * * *